United States Patent [19]

Keesen et al.

[11] Patent Number: 4,942,457
[45] Date of Patent: Jul. 17, 1990

[54] CIRCUIT ARRANGEMENT FOR PROCESSING VIDEO COMPONENTS

[75] Inventors: Heinz-Werner Keesen, Hanover, Fed. Rep. of Germany; Laurent Perdrieau, Illkirch, France

[73] Assignee: Deutsche Thomson-Brandt GmbH, Fed. Rep. of Germany

[21] Appl. No.: 360,918

[22] PCT Filed: Sep. 27, 1988

[86] PCT No.: PCT/EP88/00865

§ 371 Date: May 25, 1989

§ 102(e) Date: May 25, 1989

[87] PCT Pub. No.: WO89/03155

PCT Pub. Date: Apr. 6, 1989

[30] Foreign Application Priority Data

Sep. 30, 1987 [DE] Fed. Rep. of Germany ....... 3733004

[51] Int. Cl.⁵ .................................. H04N 11/06
[52] U.S. Cl. ..................... 358/12; 358/14; 358/22; 358/13
[58] Field of Search .......... 358/11, 12, 13, 14, 358/22

[56] References Cited

U.S. PATENT DOCUMENTS 4,163,248 7/1979 Heitmann .................... 358/13
4,821,086 4/1989 McNeely et al. ............... 358/22

FOREIGN PATENT DOCUMENTS 3020920 12/1981 Fed. Rep. of Germany ........ 358/14
59-85196 5/1984 Japan.
2140242 11/1984 United Kingdom.

OTHER PUBLICATIONS

Service Manual, Panasonic VHS, PV-4768/PV-4768-K, Order No. VRD8704307 B3, pp. 2-1-25, 2-1-26.

Primary Examiner—James J. Groody
Assistant Examiner—David E. Harvey
Attorney, Agent, or Firm—Joseph S. Tripoli; Eric P. Herrmann; James B. Hayes

[57] ABSTRACT

A video signal processor as for generating a picture-in-picture signal, generates respective analog luminance components and first and second analog chrominance components. In order to reduce the system hardware and processing speed, multiplexing circuitry subsamples the luminance and chrominance components on a field basis to provide alternating fields of only luminance and only chrominance signal. The multiplexing circuitry further subsamples the chrominance components by providing groups of horizontal lines of only the first chrominance component alternating with groups of horizontal lines of only the second chrominance component.

5 Claims, 1 Drawing Sheet

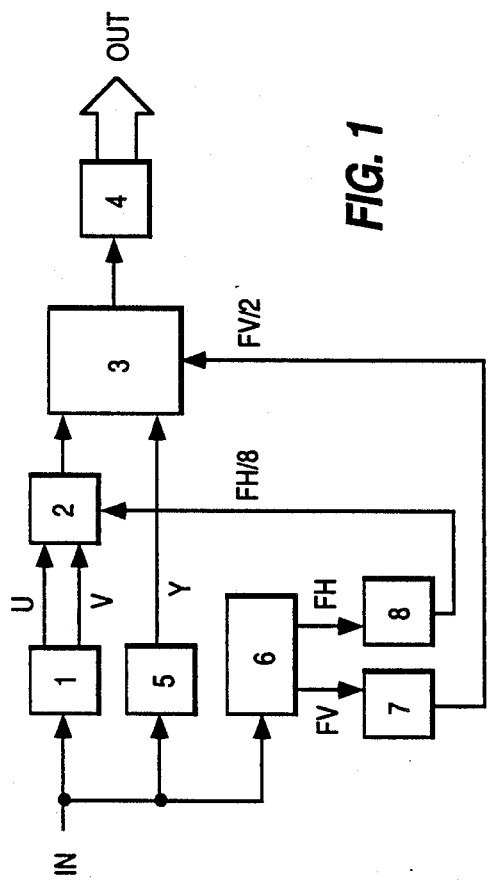
FIG. 1
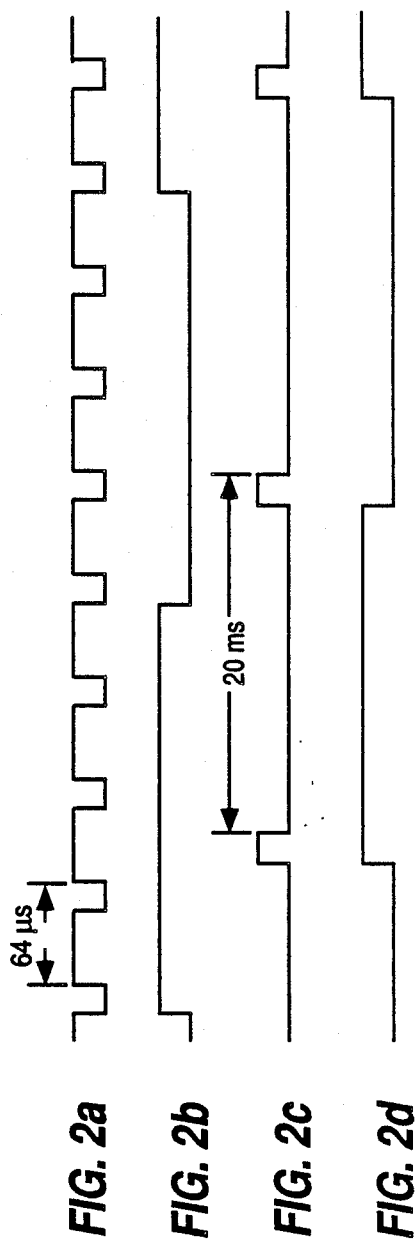
FIG. 2a
FIG. 2b
FIG. 2c
FIG. 2d

CIRCUIT ARRANGEMENT FOR PROCESSING VIDEO COMPONENTS

This invention relates to circuitry for processing video signal components.

BACKGROUND OF THE INVENTION

It is know from the journal "Funkschau", volume 25, page 53, 1985, to process and reproduce a composite video signal digitally. In this system the composite video signal is converted to digital form in an analog-to-digital converter and then split into the components of the luminance signal Y and the chrominance components U and V in a digital color decoder. In order to avoid an excessive number of connections the signals are transmitted in time multiplexed fashion and subsequently stored in picture memories.

In picture-in-picture systems wherein images from one video source are to be displayed within images from another video source, the video signals from the first source are typically split into components parts and then applied to analog-to-digital converters. Desirably only a single analog-to-digital converter is used by multiplexing the analog video components thereto. However, problems arise in multiplexing the components to a single converter. For example the analog-to-digital converter must operate at a high sampling rate in order to produce a picture of acceptable resolution.

There are several solutions to appropriately multiplexing the component video signals to a single converter. For example, the analog video component signals may be sampled and multiplexed to form horizontal lines of signal in the form of YUYV sampled data where Y is the luminance signal and U and V are the chrominance signal parts ($U=B-Y$, $V=R-Y$). These sequences of sampled data are applied to the analog-to-digital converter which generates their digital counterparts. The digital values are written to memory at a first frequency rate, and read out at a higher frequency rate to achieve horizontal compression of the image. For vertical compression only one out of every set of three or four horizontal lines of the video input signal is analyzed. The reduction ratio is selected dependent on the desired result. If necessary, the signal is applied to a vertical filter.

The signal read from memory is applied to three digital-to-analog converters to reproduce the compressed Y, U and V signals. Subsequently, the compressed signals are substituted for portions of the main video signal.

The concepts developed to date provide picture-in-picture processing for TV signals requiring a reduced number of circuit connections. However, a relatively high multiplexing frequency is used in order to obtain a correct signal bandwidth for each video component.

It is an object of the present invention to provide a circuit for processing a picture-in-picture video signal at reduced cost.

SUMMARY OF THE INVENTION

The present invention provides for subsampling the input video signal in order to reduce the amount of data to be processed. Subsampling results in the loss of picture information to be displayed, however this loss of information is acceptable because the size of the reproduced image is reduced. For example, the inset image may be reduced to a quarter of its original size. In processing the video signal the luminance and color difference components may be selected. Both parts of the signal (luminance and chrominance) may be applied to the same horizontal filter structure and a single analog-to-digital converter.

In the present invention, separated chrominance components (U, V) are coupled to a first multiplexer which alternately selects the respective chrominance components at a rate of $F_H/N$, where $F_H$ is the horizontal line frequency and N is an integer greater than 2. The output of the first multiplexer and the luminance component are coupled to respective signal input terminals of a second multiplexer. The second multiplexer is conditioned to alternately provide the luminance and chrominance components at one half the vertical frequency. That is, the second multiplexer provides fields of luminance samples alternating with fields of chrominance samples.

BRIEF DESCRIPTION OF THE DRAWINGS

FIG. 1 is a block diagram of video signal multiplexing circuitry embodying the present invention.

FIG. 2 is a waveform diagram useful in describing the invention.

DETAILED DESCRIPTION

Referring to FIG. 1, a video signal is applied from a source (not shown) to an input terminal, IN. It is fed to the input of a color decoder 1, a low pass filter 5, a sync separator circuit and central clock pulse generator 6. At the output of the color decoder 1 separated chrominance signal components U, V are provided which are applied to a 2-in-1 multiplexer 2. In the exemplary embodiment the 2-in-1 multiplexer is switched by a square wave signal at a frequency $F_H/8$ which is equivalent to one eighth of the line frequency. The multiplexer 2 outputs successive groups of four lines of the component U alternating with groups of four lines of the component V. The output of the 2-in-1 multiplexer 2 and the output of the low pass filter 5, at which the luminance signal is present, are coupled to a 2-in-1 multiplexer 3, which is switched at a frequency $F_V/2$. The frequency $F_V/2$ is equivalent to one half of the picture frequency. Thus, the inputs of the multiplexer 3 are switched at each field interval. The switching signals $F_H/8$, $F_V/2$ for controlling the multiplexers 2, 3 are generated by the sync separator circuit and central clock pulse generator 6 and by dividers 7, 8. The output of the multiplexer 3 is coupled to an analog-to-digital converter 4 which provides digital representations of the multiplexed video signal.

FIG. 2a illustrates the horizontal timing of a video signal and FIG. 2b shows the switching frequency $F_H/8$ generated from the horizontal pulse by the sync separator circuit and central clock pulse generator 6 and divider 8. FIG. 2c shows the picture vertical timing pulses, and FIG. 2d shows the switching frequency $F_V/2$ generated from the vertical pulses by the sync separator circuit and central clock pulse generator 6 and the divider 7.

According to the invention, out of a full picture the fields are processed by means of the multiplexers 2, 3 in such a way, for example, that in the first field the luminance signal Y and in the other field the color difference signals U and V are used.

Thus, from the incoming picture signals, for the first field only the luminance signal Y is fed to the analog-to-digital converter 4. The next field contains only the information of the two color difference signals U or V wherein the first four successive lines contain the first color component U of the field and the next four successive lines contain the second component V. This process is repeated throughout the second field.

Table I illustrates in part the line format of the video components of two successive fields.

TABLE I

| line # | 1st field | 2nd field |
| --- | --- | --- |
| 1 | Y | U |
| 2 | Y | U |
| 3 | Y | U |
| 4 | Y | U |
| 5 | Y | V |
| 6 | Y | V |
| 7 | Y | V |
| 8 | Y | V |
| 9 | Y | U |
| 10 | Y | U |
| . | . | . |
| . | . | . |
| . | . | . |

We claim:

1. A circuit arrangement for processing video signal components including an analog luminance component and first and second analog chrominance components, said circuit arrangement comprising:
   respective input terminals for receiving said analog luminance component and said first and second analog chrominance components;
   multiplexing means having first, second and third input terminals for respectively receiving said first and second analog chrominance components and said luminance component, and having an output terminal; and
   means coupled to said multiplexing means for conditioning said multiplexing means to provide at its output terminal, fields of video signal alternating between a field of said first and second analog chrominance components and a field of said analog luminance components and for conditioning said multiplexing means to provide said field of first and second analog chrominance components as successive groups of N horizontal lines of said first analog chrominance component alternating with groups of M horizontal lines of said second analog chrominance component where M and N are integers greater than one.

2. The circuit arrangement set forth in claim 1 wherein the integers M and N are both equal to four.

3. The circuit arrangement set forth in claim 1 wherein said multiplexing means comprises:
   a first multiplexer having first and second input terminals for respectively receiving said first and second analog chrominance components, and having an output terminal;
   a second multiplexer having a first input terminal coupled to receive said analog luminance component and a second input terminal coupled to the output terminal fo the first multiplexer, said second multiplexer having an output terminal for providing output signal from said multiplexing means; and
   said means for conditioning the multiplexing means includes means for conditioning said second multiplexer to alternately couple its first and second input terminals to its output terminal at a rate of one half of video field frequence, and for conditioning said first multiplexer to alternately couple its first and second input terminals to its output terminal at a rate of $F_H/(M+N)$ where $F_H$ is the horizontal line frequency.

4. The circuit apparatus set forth in claim 3 wherein the values of M and N are equal to four.

5. The circuit apparatus set forth in claim 1 further including an analog-to-digital converter having an input terminal coupled to said multiplexing means.

* * * * *